US010367611B2

(12) United States Patent
Chen et al.

(10) Patent No.: US 10,367,611 B2
(45) Date of Patent: Jul. 30, 2019

(54) METHODS AND APPARATUS FOR ENHANCEMENT FOR HARQ WITH CHANNEL REPETITIONS

(71) Applicant: MEDIATEK Singapore Pte. Ltd., Singapore (SG)

(72) Inventors: Tao Chen, Beijing (CN); Hua-Min Chen, Beijing (CN); Min Wu, Beijing (CN)

(73) Assignee: HFI Innovation INC., HsinChu (TW)

( * ) Notice: Subject to any disclaimer, the term of this patent is extended or adjusted under 35 U.S.C. 154(b) by 152 days.

(21) Appl. No.: 15/681,786

(22) Filed: Aug. 21, 2017

(65) Prior Publication Data

US 2017/0346607 A1    Nov. 30, 2017

Related U.S. Application Data

(63) Continuation of application No. PCT/CN2016/079466, filed on Apr. 15, 2016.

(51) Int. Cl.
*H04L 1/00* (2006.01)
*H04L 1/18* (2006.01)
(Continued)

(52) U.S. Cl.
CPC ........... *H04L 1/1896* (2013.01); *H04L 1/08* (2013.01); *H04L 1/189* (2013.01); *H04L 1/1864* (2013.01);
(Continued)

(58) Field of Classification Search
None
See application file for complete search history.

(56) References Cited

U.S. PATENT DOCUMENTS 8,121,209 B2 * 2/2012 Lee ................ H04B 7/0885
370/334
2009/0161749 A1 * 6/2009 Nangia ............. H04L 5/0007
375/233
(Continued)

FOREIGN PATENT DOCUMENTS

CN       102647248 A    8/2012
CN       104025688 A    9/2014
WO    WO2013062374 A1    5/2013

OTHER PUBLICATIONS

International Search Report and Written Opinion of International Search Authority for PCT/CN2016/079466 dated Jul. 7, 2017 (10 pages).

(Continued)

*Primary Examiner* — Mujtaba M Chaudry
(74) *Attorney, Agent, or Firm* — Imperium Patent Works; Helen Mao (57) ABSTRACT

Methods are provided for HARQ with channel repetitions. In one novel aspect, the user equipment (UE) receives the resource grant and determines the type of the grant as being the initial resource grant or the secondary resource grant. The initial resource grant carries full control information and the secondary resource grant carries partial control information. In some embodiments, the determination of the type of the grant is based on the RNTI or the payload size. In another embodiment, the UE performs data retransmission based on information from the secondary resource grant and the initial resource grant. In another novel aspect, the UE receives higher layer, such the RRC layer. The UE subsequently receives UL or DL secondary resource grant for both initial transmission and the re-transmission. The UE combines the parameters in the UE-specific configuration and the received secondary resource grants for its UL transmission or DL reception.

20 Claims, 6 Drawing Sheets

(51) Int. Cl.
*H04W 72/12* (2009.01)
*H04L 1/08* (2006.01)
*H04W 72/14* (2009.01)

(52) U.S. Cl.
CPC ... *H04W 72/1284* (2013.01); *H04W 72/1289* (2013.01); *H04W 72/14* (2013.01)

(56) References Cited

U.S. PATENT DOCUMENTS

| | | | |
|---|---|---|---|
| 2009/0238241 A1* | 9/2009 | Hooli | H04B 1/7143 375/133 |
| 2009/0285160 A1* | 11/2009 | Cheng | H04L 1/1854 370/328 |
| 2009/0307554 A1* | 12/2009 | Marinier | H04L 1/1812 714/748 |
| 2011/0002314 A1* | 1/2011 | Choi | H04W 84/045 370/338 |
| 2013/0031608 A1* | 1/2013 | Alfano | H04L 41/042 726/3 |
| 2014/0003374 A1 | 1/2014 | Kuo | 370/329 |
| 2014/0056237 A1 | 2/2014 | Eriksson et al. | 370/329 |
| 2014/0204878 A1 | 7/2014 | Jang et al. | 370/329 |
| 2014/0293975 A1 | 10/2014 | Kim et al. | 370/336 |
| 2014/0362832 A1* | 12/2014 | Rudolf | H04L 1/1822 370/336 |
| 2015/0270939 A1* | 9/2015 | Ro | H04L 5/0051 370/329 |
| 2015/0282209 A1 | 10/2015 | Shao et al. | 370/329 |
| 2018/0139727 A1* | 5/2018 | Bayesteh | H04B 7/04 |

OTHER PUBLICATIONS

EPO, Search Report for the EP patent application 16779628.3 dated Oct. 18, 2018 (10 pages).
R2-152763 3GPP TSG RAN WG1 #81, Qualcomm Incorporated, "Physical Downlink Control Channesl", Fukuoka, Japan, May 25-29, 2015 (6 page) *section 3*.

* cited by examiner

METHODS AND APPARATUS FOR ENHANCEMENT FOR HARQ WITH CHANNEL REPETITIONS

CROSS REFERENCE TO RELATED APPLICATIONS

This application is filed under 35 U.S.C. § 111(a) and is based on and hereby claims priority under 35 U.S.C. § 120 and § 365(c) from International Application No. PCT/CN2016/079466, with an international filing date of Apr. 15, 2016, which in turn claims priority from PCT Application Number PCT/CN2015/076866, entitled, "ENHANCEMENT FOR HARQ WITH CHANNEL REPETITION" filed on Apr. 17, 2015. This application is a continuation of International Application No. PCT/CN2016/079466, which claims priority from International Application No. PCT/CN2015/076866. International Application No. PCT/CN2016/079466 is pending as of the filing date of this application, and the United States is a designated state in International Application No. PCT/CN2016/079466. This application claims priority under 35 U.S.C. § 120 and § 365(c) from International Application Number PCT/2015/076866 filed on Apr. 17, 2015. The disclosure of each of the foregoing documents is incorporated herein by reference.

TECHNICAL FIELD

The disclosed embodiments relate generally to wireless communication, and, more particularly, to HARQ with channel repetitions.

BACKGROUND

In 3GPP LTE Rel-13 machine type communication (MTC) working item description (WID), there are three requirements, which are respectively low complexity, coverage enhancement, and power consumption. For coverage enhancement (CE), a target maximum coupling loss (MCL) of 155.7 dBm is proposed for both Rel-13 low complexity MTC UE and other non-MTC UE operating delay tolerant MTC applications. For PUSCH with the bottleneck of MCL among all physical channels, i.e. 140.7 dBm MCL, the target MCL of 155.7 dBm means maximum 15 dB coverage enhancement. Considering compensation of some coverage loss caused by low complexity, e.g. 3 dB transmission power reduction for uplink, it is required to achieve maximum 18 dB coverage enhancement. In order to achieve the target of coverage enhancement, repetition is necessary for most physical channels/signals. Many technologies can be used to improve the efficiency of repetition, i.e. to reduce the number of repetitions as far as possible, such as cross-subframe channel estimation, increasing DMRS density, uplink PSD boosting, and frequency hopping and so on.

In CE mode for Rel-13 MTC, channel repetition has been considered to improve data reception at low working SINR operation point by combining the repeated data. In the current LTE system, HARQ operation with one transmission per HARQ attempt has been used to exploit the frequency/time diversity of the channel for the combination gain. Besides, HARQ operation is also coupled with link adaptation, e.g., link adaptation may target 10% BLER after 1st HARQ transmission. Essentially, LTE HARQ transmission is a Stop-And-Wait (SAW) retransmission whereas the channel repetition is a non-stop or blind retransmission without feedback. So it seems necessary to support channel repetition as well as HARQ retransmission due to slightly different purposes. In this case, channel repetition can be applied for each HARQ transmission attempt while HARQ (re)transmission with feedback can be still kept. So HARQ mechanism should be supported with channel repetition for each HARQ transmission attempt.

Regarding to HARQ transmission for UE in CE mode, it seems not necessary to support full-adaptive HARQ, which may cause the large control overhead due to the data retransmission associated control channel carrying full control information and high power consumption for UE receiving the repeated control channel. Typically, the larger DCI the longer time for UE processing. However, the adaptation on the repetition number for retransmission is meaningful, which can improve spectrum efficiency by using a smaller repetition number than the repetition number for the initial transmission.

A new design to support HARQ retransmission for UE in CE mode is needed. In light of such motivation, a compact DCI with truncated format carrying partial control information for HARQ retransmission is proposed to carry the necessary and limited information for support the partial-adaptive HARQ for UEs in CE mode.

Improvements and enhancements are required for HARQ with channel repetitions.

SUMMARY

Methods are provided for HARQ with channel repetitions. In one novel aspect, UE receives the (first) DL grant from a base station to determine a reception of the initial HARQ transmission comprising a certain number of data repetitions. If UE fails to decode the data, it will at least provide the feedback information about the expected number of data repetitions per HARQ retransmission attempt as well as the NACK information. Accordingly, the UE may receive the secondary DL grant from the base station to determine the means of receiving HARQ retransmissions according to the control information obtained from both the secondary grant and the latest DL grant. The secondary DL grant can be a truncated DL grant with the limited control information fields to reduce the overhead while keeping the performance. Alternatively, a new MTC HARQ physical control channel (mPHCH) can be used to indicate the repetition number for retransmission in case of packet decoding failure.

In another embodiment, UE receives the first UL grant from a base station to determine transmission of the initial HARQ transmission. The UE may receive the secondary UL grant if the base station fails to decode the data and perform the HARQ retransmission(s). The UE will determine the means of uplink HARQ retransmission according to the control information obtained from both the secondary grant and the latest UL grant. The secondary UL grant can be a truncated UL grant with the limited control information fields, comprising at least the information about the number of repetitions per HARQ retransmission attempt, in order to reduce the overhead while keeping the performance. In general, the secondary UL/DL grant can be used to support the non-adaptive HARQ retransmission with the smaller overhead and resource consumption, whereas the first UL/DL grant can be applied to support initial HARQ transmission and adaptive HARQ retransmission. Alternatively, the mPHCH can be used to indicate the number of repetitions for UL retransmission.

In one embodiment, the secondary DL grant and secondary UL grant shares the same DCI. The secondary grant is differentiated by an additional bit to indicate whether it is for UL or DL within the DCI. The UE can reduce the complexity for blind detection of DCI. The mPHCH for UL/DL retransmission can be differentiated by different resources or additional bit to indicate UL or DL.

In another novel aspect, the UE receives higher layer, such the RRC layer, about full or partial control information for DL reception or UL transmission. The UE subsequently receives UL or DL secondary grant for both initial transmission and the re-transmission. The UE combines the parameters in the higher layer configuration and the received secondary grants for its UL transmission or DL reception.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
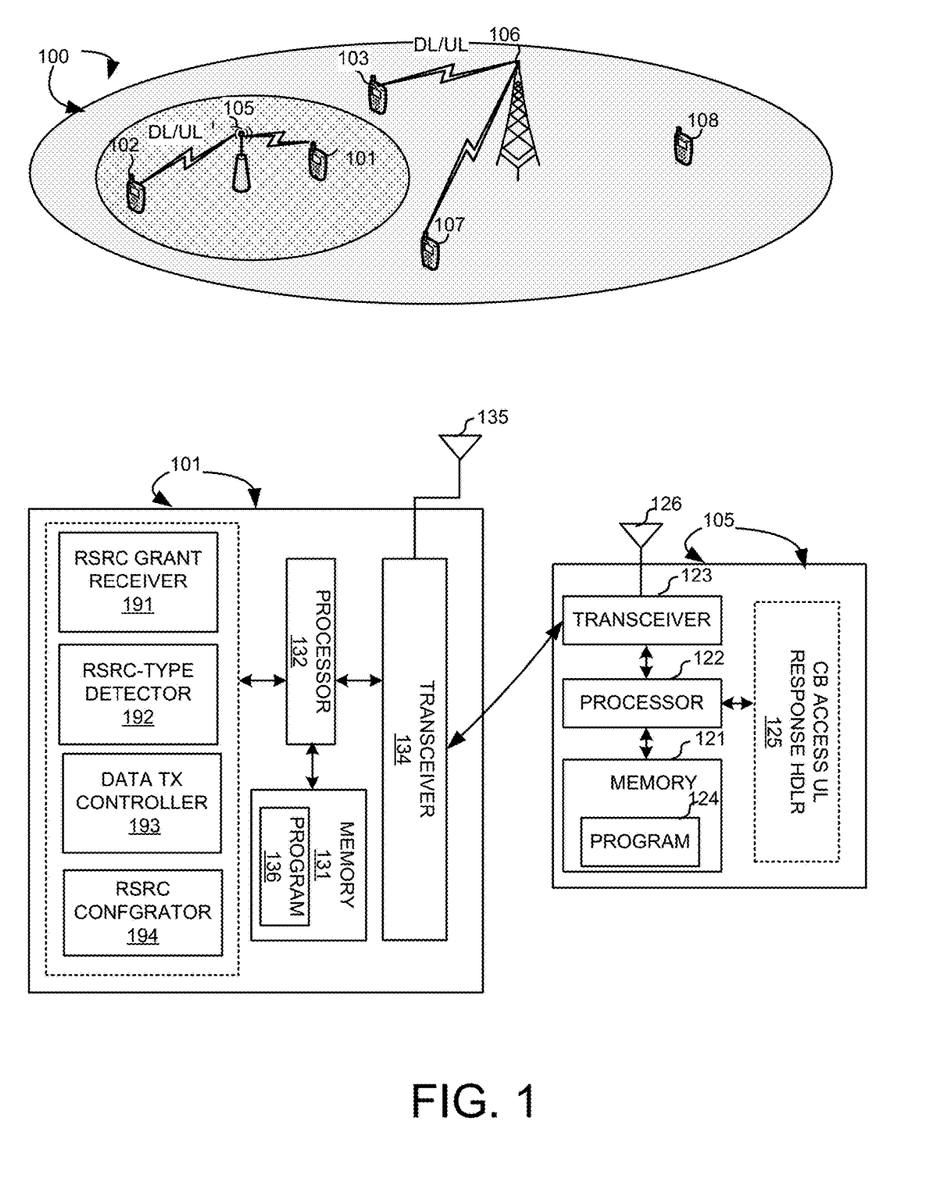
FIG. 1 illustrates an exemplary wireless communication network 100 with control-less response messages in response to the contention based resource request in accordance with embodiments of the current invention.

FIG. 1 illustrates an exemplary wireless communication network 100 in accordance with embodiments of the current invention. Wireless communications system 100 includes one or more wireless networks, and each of the wireless communication network has fixed base infrastructure units, such as wireless communications devices 105 and 106. The base unit may also be referred to as an access point, an access terminal, a base station, or by other terminology used in the art. Each of the wireless communications stations 105 and 106 serves a geographic area. The geographic area served by wireless communications stations 105 and 106 overlaps.

Wireless mobile station or user equipment (UE) 101 and 102 in the wireless network 100 are served by base station 105. Other wireless communications device, such as wireless communication device 103, 107 and 108, are served by a different base station 106. Mobile station 101 is a real LC MTC UE actually in one embodiment. In another embodiment, mobile station 101 is a normal or regular UE which is served/regarded as LC MTC UEs, such as a normal UE operating in CE mode. In this case, such normal or regular UE works in LC MTC mode. Then, an LC-MTC UE or UE in LC-MTC mode can be configured from a regular UE, an MTC UE or any other type of UE. The LC-MTC UE can be configured locally on the UE or dynamically configured through network signaling. Mobile station 101 and 103 send uplink data to base stations 105 and 106 via uplink channels (not shown) in the time and/or frequency domain. Mobile station 101 and 103 receives downlink data from base stations 105 and 106 via downlink channels (not shown) When there is a downlink packet to be sent from the eNB to the mobile station, each mobile station gets a downlink assignment, e.g., a set of radio resources in a physical downlink shared channel (PDSCH). When a UE needs to send a packet to eNodeB in the uplink, the mobile station gets a grant from the eNodeB that assigns a physical uplink shared channel (PUSCH) consisting of a set of uplink radio resources. The mobile station gets the downlink or uplink scheduling information from a physical downlink control channel (PDCCH) or an enhanced physical downlink control channel (EPDCCH) or MTC physical downlink control channel (mPDCCH) that is targeted specifically to that mobile station. The downlink or uplink scheduling information and the other control information, carried by PDCCH/EPDCCH/mPDCCH, is referred to as downlink control information (DCI).

In the embodiments of current invention, the UE is LC MTC UE or UE in CE mode, but to the person skilled in the art could know that, if the UE needs low cost, or needs the small DCI or small grant, the features in the embodiments of current invention could be used, for example the MMW system or any small cell system in 5 G or afterwards.

In one embodiment, the communication system utilizes Orthogonal Frequency Division Multiplexing Access (OFDMA) or a multi-carrier based architecture including Adaptive Modulation and Coding (AMC) on the downlink and next generation single-carrier (SC) based FDMA architecture for uplink transmissions. SC based FDMA architectures include Interleaved FDMA (IFDMA), Localized FDMA (LFDMA), DFT-spread OFDM (DFT-SOFDM) with IFDMA or LFDMA. In OFDMA based systems, remote units are served by assigning downlink or uplink radio resources that typically comprises a set of sub-carriers over one or more OFDM symbols. Exemplary OFDMA based protocols include the developing LTE/LTE-A of the 3GPP standard and IEEE 802.16 standard. The architecture may also include the use of spreading techniques such as multi-carrier CDMA (MC-CDMA), multi-carrier direct sequence CDMA (MC-DS-CDMA), Orthogonal Frequency and Code Division Multiplexing (OFCDM) with one or two dimensional spreading, or may be based on simpler time and/or frequency division multiplexing/multiple access techniques, or a combination of these various techniques. In alternate embodiments, the communication system may utilize other cellular communication system protocols including, but not limited to, TDMA or direct sequence CDMA. The disclosure, however, is not intended to be limited to any particular wireless communication system.

FIG. 1 further shows simplified block diagrams of wireless stations 101 and base station 102 in accordance with the current invention.

Base station 105 has an antenna 126, which transmits and receives radio signals. A RF transceiver module 123, coupled with the antenna, receives RF signals from antenna 126, converts them to baseband signals and sends them to processor 122. RF transceiver 123 also converts received baseband signals from processor 122, converts them to RF signals, and sends out to antenna 126. Processor 122 processes the received baseband signals and invokes different functional modules to perform features in base station 105. Memory 121 stores program instructions and data 124 to control the operations of base station 105. Base station 105 also includes a set of control modules, such as resource allocation handler 125, which carries out functional tasks for HARQ with channel repetitions and communicates with the wireless UE 101 for resource allocation related tasks.

Wireless communications device, UE 101 has an antenna 135, which transmits and receives radio signals. A RF transceiver module 134, coupled with the antenna, receives RF signals from antenna 135, converts them to baseband signals and sends them to processor 132. RF transceiver 134 also converts received baseband signals from processor 132, converts them to RF signals, and sends out to antenna 135. Processor 132 processes the received baseband signals and invokes different functional modules to perform features in UE 101. Memory 131 stores program instructions and data 136 to control the operations of UE 101.

UE 101 also includes a set of control modules that carry out functional tasks. A resource grant receiver 191 receives a resource grant, wherein the resource grant includes a repetition number for repeatedly transmission. A resource-type detector 192 determines a type of the resource grant of being an initial resource grant or a secondary resource grant, wherein the initial resource grant carries full control information and the secondary resource grant carries partial control information. A data transmission controller 193 performs a data transmission based on the received resource grant, wherein the data transmission is an uplink (UL) data transmission, or a downlink (DL) data reception. A resource configurator 194 receives higher layer UE-specific resource-grant information for the UE.

Figure 2:
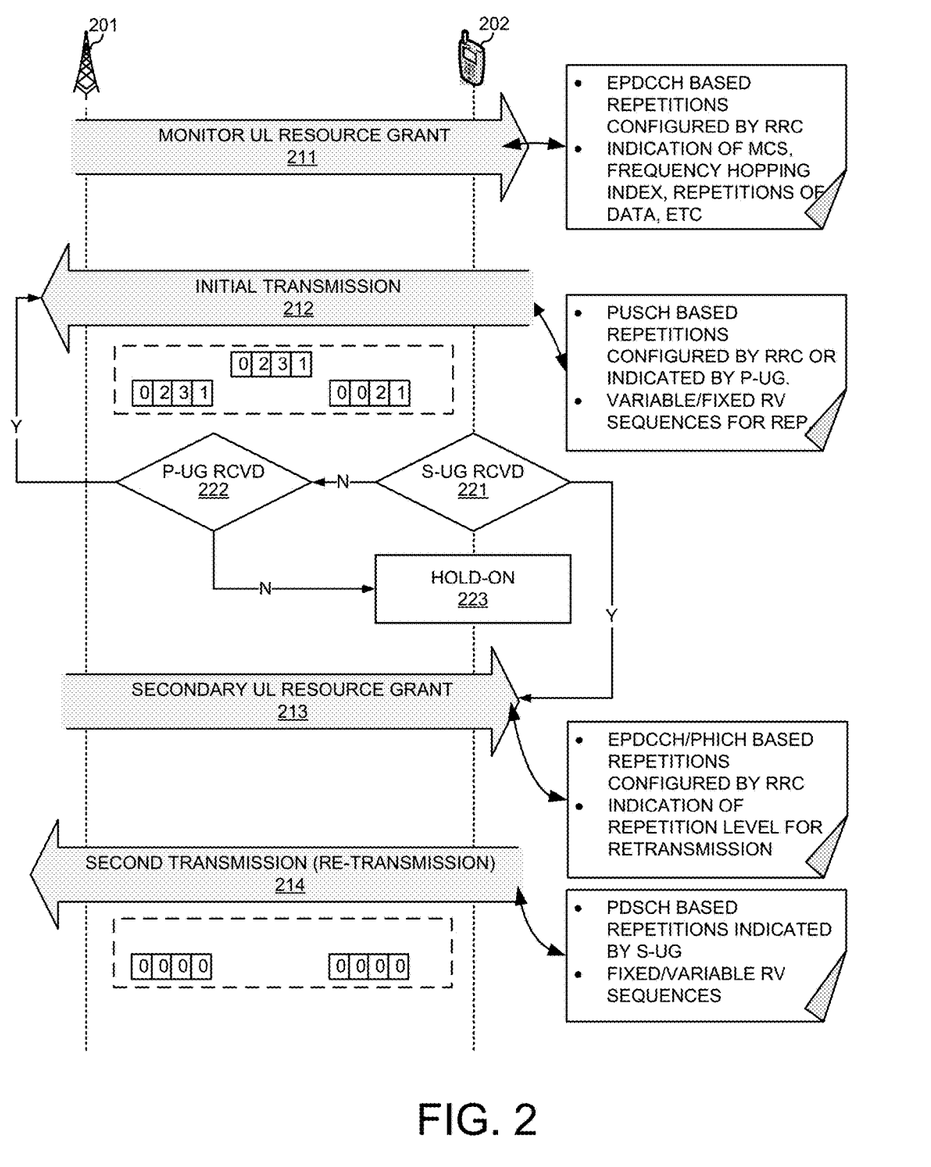
FIG. 2 shows an example of a secondary UL grant usage for HARQ retransmission in uplink according to one embodiment of current invention.

FIG. 2 shows an example of a secondary UL grant usage for HARQ retransmission in uplink according to one embodiment of current invention. In this embodiment, the UE needs Primary UL grant (P-UG) and/or Secondary UL grant (S-UG), for example, UE 202 is in CE mode, or the UE is a LC MTC UE. In this case, UE 202 is connected with an eNB 201. In one embodiment, a P-UG (Primary UL grant or normal UL grant) carries the full control information for the first transmission, which may include the parameters such as MCS, frequency hopping pattern index, the number of repetitions for first transmission and the resource allocation. The P-UG could be based on ePDCCH, and the number of repetitions can be configured by RRC signaling. An S-UG (secondary UL grant) carries the partial and/or additional control information for the retransmission, which may include the number of repetitions for retransmission and/or RV sequences for repetition. The S-UG could be based on ePDCCH/PHICH, and the number of repetitions could be a factor to the first repetition number within P-UG, wherein the factor can be configured by RRC signaling in one embodiment. In another embodiment, the number of repetitions in S-UG for retransmission is an explicit number by higher layer configuration. In one example, S-UG may only include the number of repetitions for retransmission.

As shown in FIG. 2, UE 202 receives the first UL resource grant. Upon receiving the first UL resource grant, UE performs the new data transmission according to the parameter settings carried in the first UL resource grant. For the initial transmission of data, the redundancy version (RV) sequence could be 0231, or 0021. For the repetitions of the initial transmission, the RV sequences could be variable or fixed. After initial transmission, UE 202 will receive and monitor the second UL grant from eNB after the first UL resource grant in step 211. Please note that, UE 202 monitors primary and secondary UL resource grant, which is named as a first UL grant, in step 211. After step 211, UE 202 perform initial transmission based on the first UL resource grant which is a primary UL resource grant, or a retransmission based on the first UL resource grant which is a secondary UL grant in step 212.

For UE 202, after step 212, in step 221, UE 202 determines if the received second grant (i.e. different from the first UL resource grant in step 211) is a primary/initial resource grant. If step 221 determines no, the UE moves to step 222 and determines if it is a P-UG. If step 222 determines yes, the UE moves to step 212 and starts the initial transmission. If step 222 determines no, the UE moves to step 223 and holds on to wait. If step 222 determines yes, the UE moves to step 213 and decoding the S-UG. At step 214, upon receiving the S-UG, UE 202 performs the data retransmission according to the parameter settings carried in the S-UG and the remaining parameters carried in the P-UG corresponding to the initial transmission or the latest transmission for full-adaptive retransmission. For the second transmission of data, the RV sequence could be different from the initial transmission, such as 0000. The repetitions of the second transmission, the RV sequences could be variable or fixed. eNB 201 can combine the data from the initial transmission and retransmission for data decoding. The UE determines the new data transmission or data retransmission based on whether the received UL grant is a primary UG or a secondary UG. It also means that there is no need of Physical HARQ Indication Channel (PHICH) to indicate ACK/NACK information. In this case, ACK/NACK is implicitly indicated by transmission of P-UG or S-UG.

In one special case, when UE 202 received the first UL resource grant, UE 202 monitor the first UL resource grant in step 211 and determines that, it is a secondary UL resource grant, and then perform corresponding data transmission based on the first UL resourced grant, and in other words, only the secondary UL resource grant is determined and used in step 221. So the data transmission corresponding to the secondary grant comprises the initial transmission and the retransmission. In this case, the secondary UL resource grant is used for both initial transmission and the retransmission. For UEs using this compact DCI carrying the secondary UL resource grant could save resource and improve spectrum efficiency.

Figure 3:
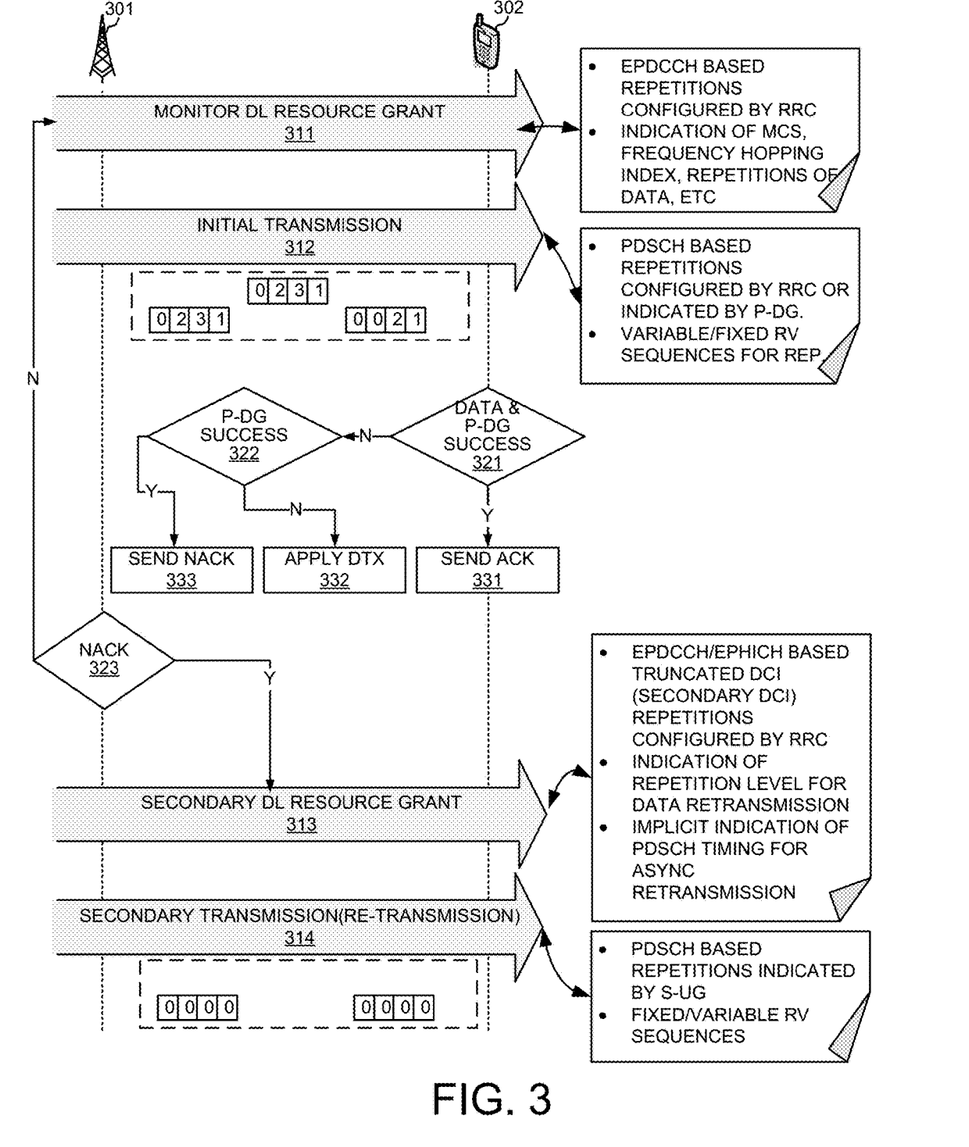
FIG. 3 shows an example of a secondary DL grant usage for HARQ retransmission in downlink according to one embodiment of current invention.

FIG. 3 shows an example of a secondary DL grant usage for HARQ retransmission in downlink according to one embodiment of current invention. A UE 302 is connected with an eNB 301 in a wireless network. UE 302 receives the first DL resource grant from eNB 301, and then performs the initial data transmission based on the first DL resource grant. After that, UE 302 receives and monitors the second DL resource grant from eNB 301 and so on. Please note that, UE 302 monitors primary and secondary UL resource grant, which is named as a first UL grant in step 311. After step 311, UE 302 perform initial transmission based on the first UL resource grant which is a primary UL resource grant, or data retransmission based on the first UL resource grant which is a secondary UL grant in step 312.

The initial DL grant/Primary DL grant (P-DG) carries the full control information for the new data transmission. (i.e., $1^{st}$ data transmission. The P-DG may include the parameters such as MCS, frequency hopping pattern index, the number of repetitions for first transmission and the resource allocation. Upon receiving the P-DG in step 311, at step 312 the UE receives the new data transmission according to the parameter settings carried in the P-DG. After that, in step 321, the UE determines if the received data and the P-DG are successful. If step 321 determines yes, the UE moves to step 331 and sends ACK to eNB 301. If step 321 determines no, UE 302 moves to step 322 and determines if P-DG is received correctly. If step 322 determines no, the UE won't perform any UL transmission at step 332, which will be determined by eNB as DTX later. If step 322 determines yes, the UE moves step 333 and sends NACK to eNB 301. After step 331, 332 or 333, eNB 301 determines whether a NACK is received at step 323. eNB 301 upon receiving NACK, eNB 301 could transmit S-DG for partial-adaptive retransmission at step 313, or transmits P-DG for full-adaptive retransmission or new data transmission. At step 314, the UE receives the secondary transmission/retransmission.

An S-DG (secondary DL grant) carries the partial or additional control information for the retransmission, which may include the number of repetitions for retransmission and/or RV sequences for repetitions. In one novel aspect, S-DG could be based on ePDCCH/PHICH, and it could comprise truncated DCI (or named as secondary DCI), except for the indication of repetition level for data retransmission, it could also comprise implicit indication of PDSCH timing for asynchronous retransmission. The settings of remaining parameters for decoding data can be obtained from the information carried in the P-DG. S-DG could also carry the additional information, which is not included in the P-DG. eNB 301 will further determine the received information from UE about the initial transmission at step 323. If step 323 determines no, eNB 301 received ACK or DTX from UE. Then, eNB 301 could transmit P-DG for new data transmission or full-adaptive retransmission. UE can combine the data from initial transmission and retransmission for decoding. The UE determines the new data transmission or data retransmission from eNB based on whether the received DL grant is a primary DG or a secondary DG. In one novel aspect, the NACK could be derived based on PUCCH, and in NACK, there is recommendation of repetition level for data transmission.

In another embodiment, if semi-persistent scheduling is applied, a P-UG/DG is scrambled with SPS-RNTI to indicate the configuration for the new data transmission. In this case, an S-UG/DG is required to control data retransmission for partial-HARQ operation. Additionally, a P-UG/DG can also be applied to control data retransmission for full-adaptive HARQ retransmission. The settings of remaining parameters for retransmitted data reception can be based on the P-UG/DG scrambled with SPS-RNTI for the initial transmission in addition to the information carried in the S-UG/DG and/or the information carried in the P-UG/DG scrambled with C-RNTI for retransmission.

In another embodiment, instead of semi-persistent scheduling the most parameters can be configured by the higher layer signaling at least for the initial transmission. These parameters can be updated by the higher layer signaling (e.g., RRC signaling) or P-UG/DG. For example, P-UG/DG with new data indicator to indicate the new data transmission can be used to carry the updated parameter settings for the initial transmission. Such configuration change can be valid until reception of the next P-UG/DG with the new data indicator to indicate the new data transmission. Alternatively, P-UG/DG for change of the parameters in a period can be scrambled with a new RNTI such as the U-RNTI, the RNTI for parameter updating, to differentiate with the normal grant for one time transmission. For the retransmission, S-UG/DG can be used to control the retransmission associated with the parameter settings by the higher layer and the updated parameter settings carried by P-UG/DG with a new data indicator and/or a new RNTI.

An S-DG/UG can be carried by mPDCCH, mPDCCH with eREG/eCCE based resource allocation if the large control information bits are needed. The number of repetitions for mPDCCH transmission can be configured or re-configured by RRC layer based on UE report on the level of coverage enhancement. The UE report indicates the repetition number or level with the hypothesis of 1% BLER target for S-DG/UG reception.

For S-DG/UG transmission, a new RNTI, Secondary RNTI(S-RNTI) can be assigned and scrambled with CRC. UE can decode mPDCCH with CRC scrambled with S-RNTI to identify if it is a secondary grant. The assigned S-RNTI can be signaled to UE via the higher layer signaling, such as the RRC signaling. Alternatively, the same RNTI for the P-DG/UG can be used for S-DG/UG transmission. In this case, UE can identify whether it is a normal grant or a secondary grant based on DCI (Downlink Control Information) payload size assuming the different payload sizes are used for the normal and secondary grants.

Figure 4:
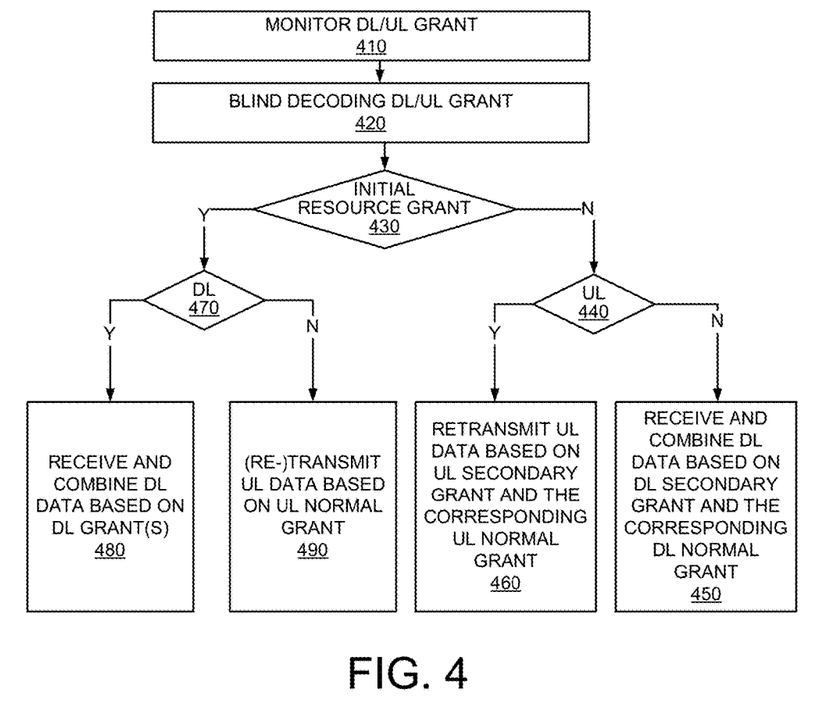
FIG. 4 shows an exemplary diagram of the UE processing the received grant(s) from eNB in accordance with embodiments of the current invention.

FIG. 4 shows an exemplary flow chart of the UE processing the received grant(s) from eNB in accordance with embodiments of the current invention. UE will monitor the mPDCCH for grant(s) in step 410. Based on blind decoding of the grants in step 420, UE can check CRC scrambled with S-RNTI or C-RNTI to determine whether the decoded DCI is for a normal grant or a secondary grant in step 430. Afterwards, UE can check the UL/DL flag in the grant to check whether it is for UL grant or DL grant. If the grant is a normal grant, UE determines if the normal grant is DL or UL normal grant by checking the UL/DL flag in step 470, if the flag indicates that the grant is an UL normal grant, and the UE transmits or retransmits UL data based on the UL normal grant in step 490, or else receives and combine DL data based on the DL normal grant in step 480. If the grant is secondary grant in step 430, and then UE further determines if the secondary grant is DL or UL secondary grant by checking UL/DL flag in step 440, if the flag indicates that the secondary grant is a UL secondary grant, and then UE retransmits UL data based on UL secondary grant and the corresponding UL normal grant in step 460, or receives and combines Dl data based on DL secondary grant and the corresponding DL normal grant in step 450.

In another novel aspect, the UE receives resource configuration by higher layer, such as the RRC layer. The UE subsequently receives UL or DL secondary resource grant for both initial transmission and the re-transmission. The UE combines the parameters in the UE-specific higher layer configuration and the received secondary resource grants for its UL transmission or DL reception. One field within the secondary UL/DL grant will indicate the grant is to trigger a new transmission or retransmission.

Figure 5:
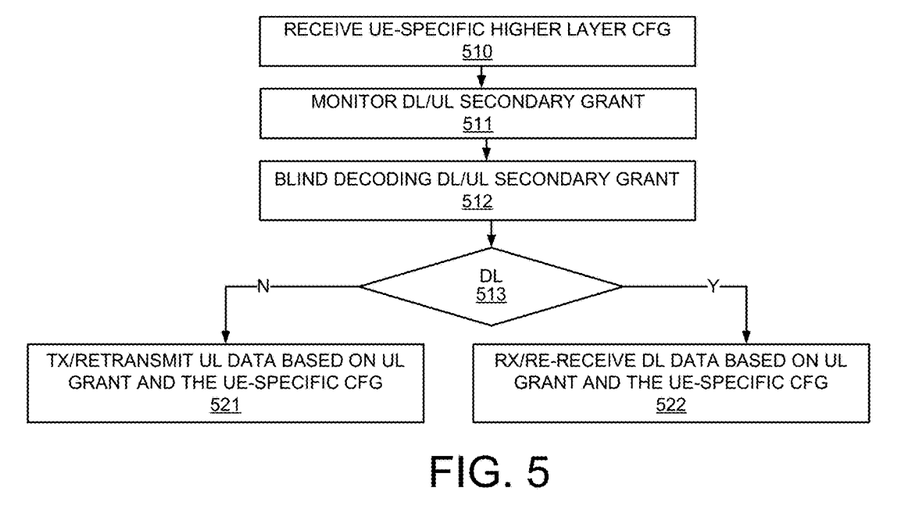
FIG. 5 shows an exemplary diagram for the UE to combine an UE-specific configuration with a secondary resource grant in accordance with embodiments of the current invention.

FIG. 5 shows an exemplary diagram for the UE to combine an UE-specific configuration with a secondary resource grant in accordance with embodiments of the current invention. At step 510, the UE receives UE-specific higher layer configuration information. At step 511, the UE monitors the DL/UL secondary resource grant. At step 512, the UE blindly decodes the DL/UL secondary resource grant. At step 513, the UE determines whether this is a DL grant. If step 513 determines no, the UE transmits or retransmits the UL data based on the secondary UL grant and the received UE-specific resource configuration in step 521. If step 513 determines yes, the UE receives or re-receives the DL data based on the secondary DL grant and the received UE-specific resource configuration in step 522.

Figure 6:
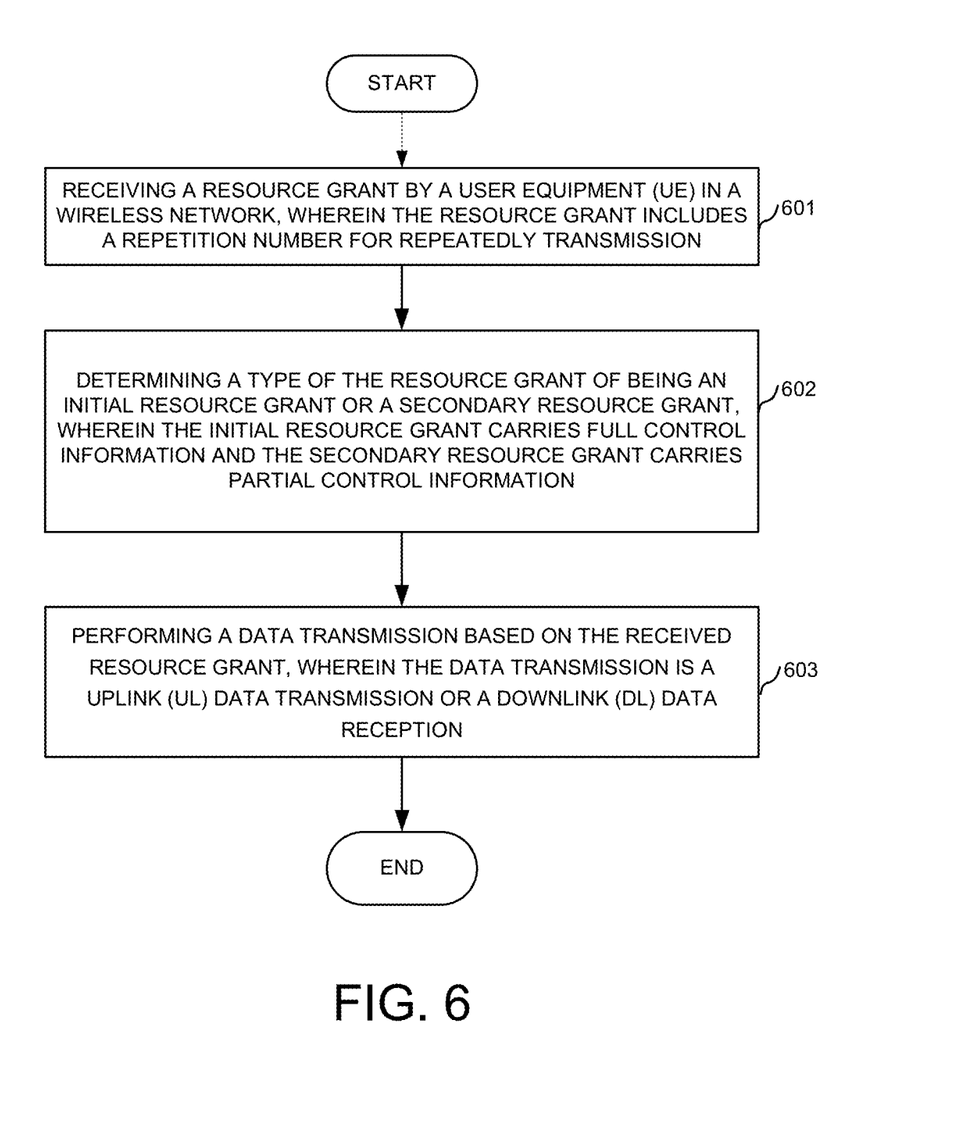
FIG. 6 shows an exemplary flow chart of the UE processing the received grant(s) from eNB in accordance with embodiments of the current invention.

FIG. 6 shows an exemplary flow chart of the UE processing the received grant(s) from eNB in accordance with embodiments of the current invention. At step 601, the UE receiving a resource grant in a wireless network, wherein the resource grant includes a repetition number for repeatedly transmission. At step 602, the UE determines a type of the resource grant of being an initial resource grant or a secondary resource grant, wherein the initial resource grant carries full control information and the secondary resource grant carries partial control information. At step 603, the UE performs a data transmission based on the received resource grant, wherein the data transmission is a UL data transmission or a DL data reception.

Figure 7:
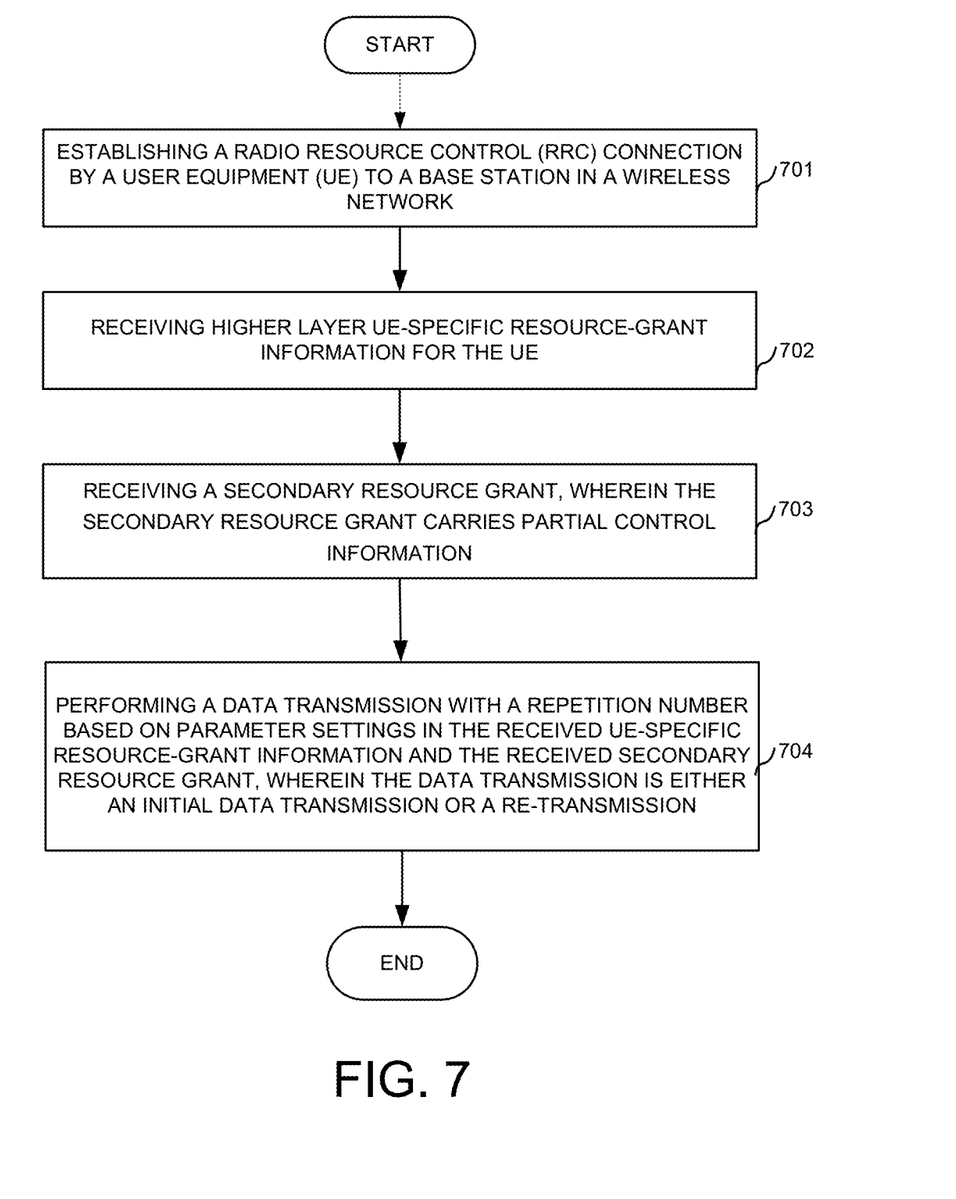
FIG. 7 shows an exemplary flow chart for the UE to combine an UE-specific configuration with a secondary resource grant in accordance with embodiments of the current invention.

FIG. 7 shows an exemplary flow chart for the UE to combine an UE-specific configuration with a secondary resource grant in accordance with embodiments of the current invention. At step 701, the UE establishes RRC connection to a base station in a wireless network. At step 702, the UE receives higher layer UE-specific resource-grant information for the UE. At step 703, the UE receives a secondary resource grant, wherein the secondary resource grant carries partial control information. At step 704, the UE performs a data transmission with a repetition number based on parameter settings in the received UE-specific resource-grant information and the received secondary resource grant, wherein the data transmission is either an initial data transmission or a re-transmission.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
receiving a resource grant by a user equipment (UE) in a wireless network, wherein the resource grant includes a repetition number for repeatedly transmission;
determining a type of the resource grant of being an initial resource grant or a secondary resource grant, wherein the initial resource grant carries full control information and the secondary resource grant carries partial control information; and
performing a data transmission based on the received resource grant, wherein the data transmission is a uplink (UL) data transmission or a downlink (DL) data reception.

2. The method of claim 1, wherein the determination of the type of the resource grant is at least based on a radio network temporary identifier (RNTI) scrambled in CRC, and wherein a cell RNTI (C-RNTI) is configured for the initial resource grant and a secondary RNTI (S-RNTI) is configured for the secondary resource grant.

3. The method of claim 2, wherein the determination of the type of the resource grant is based on a payload size of the resource grant, and wherein the payload size for the initial resource grant is greater than the secondary payload size.

4. The method of claim 1, wherein the full control information comprises at least one of the following parameters: a frequency hopping pattern index, a number of repetition for transmission, a RV sequence number, an UL/DL flag, an ACK/NACK flag and a new data indicator.

5. The method of claim 1, wherein the partial control information further comprises at least one of the following parameters: a frequency hopping pattern index, RV sequence number, an ACK/NACK flag and an UL/DL flag.

6. The method of claim 1, wherein the data transmission is an initial transmission, and wherein the transmission is based on the initial resource grant.

7. The method of claim 1, wherein the data transmission is a re-transmission, and wherein the re-transmission is based on parameter settings in the received secondary resource grant and remaining parameter settings in the corresponding initial resource grant.

8. A method comprising:
establishing a radio resource control (RRC) connection by a user equipment (UE) to a base station in a wireless network;
receiving higher layer UE-specific resource-grant information for the UE;
receiving a secondary resource grant, wherein the secondary resource grant carries partial control information, and the partial control information comprises a number of repetition for transmission; and
performing a data transmission with a repetition number based on parameter settings in the received UE-specific resource-grant information and the received secondary resource grant, wherein the data transmission is either an initial data transmission or a re-transmission.

9. The method of claim 8, wherein the UE-specific resource-grant information is received during a RRC connection establishment.

10. The method of claim 8, wherein the partial control information further comprises at least one of the following parameters: a frequency hopping pattern index, a RV sequence number, an ACK/NACK flag and an UL/DL flag.

11. A user equipment (UE), comprising:
a RF transceiver that transmits and receives radio signals a wireless network;
a resource grant receiver that receives a resource grant, wherein the resource grant includes a repetition number for repeatedly transmission;
a resource-type detector that determines a type of the resource grant of being an initial resource grant or a secondary resource grant, wherein the initial resource grant carries full control information and the secondary resource grant carries partial control information; and
a data transmission controller that performs a data transmission based on the received resource grant, wherein the data transmission is a uplink (UL) data transmission or a downlink (DL) data reception.

12. The UE of claim 11, wherein the determination of the type of the resource grant is at least based on a radio network temporary identifier (RNTI) scrambled in CRC, and wherein a cell RNTI (C-RNTI) is configured for the initial resource grant and a secondary RNTI (S-RNTI) is configured for the secondary resource grant.

13. The UE of claim 12, wherein the determination of the type of the resource grant is based on a payload size of the resource grant, and wherein the payload size for the initial resource grant is greater than the secondary payload size.

14. The UE of claim 11, wherein the full control information comprises at least one of the following parameters: a frequency hopping pattern index, a number of repetition for transmission, a RV sequence number, an UL/DL flag, an ACK/NACK flag and a new data indicator.

15. The UE of claim 11, wherein the partial information comprises at least one of the following parameters: a frequency hopping pattern index, a number of repetition for transmission, a RV sequence number, an ACK/NACK flag and an UL/DL flag.

16. The UE of claim 11, wherein the transmission is an initial transmission, and wherein the transmission is based on the initial resource grant.

17. The UE of claim 11, wherein the transmission is a re-transmission, and wherein the re-transmission is based on parameter settings in the received secondary resource grant and remaining parameter settings in the corresponding initial resource grant.

18. A user equipment (UE), comprising:
- a RF transceiver that transmits and receives radio signals a wireless network;
- a resource configurator that receives higher layer UE-specific resource-grant information for the UE;
- a resource grant receiver that receives a secondary resource grant, wherein the secondary resource grant carries partial control information; and
- a data transmission controller that performs a data transmission with a repetition number based on parameter settings in the received UE-specific resource-grant information and the received secondary resource grant, wherein the data transmission is either an initial data transmission or a re-transmission.

19. The UE of claim 18, wherein the UE-specific resource-grant information is received during a RRC connection establishment.

20. The UE of claim 18, wherein the partial control information comprises at least one of the following parameters: a frequency hopping pattern index, a number of repetition for transmission, a RV sequence number, an ACK/NACK flag and an UL/DL flag.

* * * * *

UNITED STATES PATENT AND TRADEMARK OFFICE
CERTIFICATE OF CORRECTION

PATENT NO. : 10,367,611 B2  
APPLICATION NO. : 15/681786  
DATED : July 30, 2019  
INVENTOR(S) : Tao Chen et al.

Page 1 of 1

It is certified that error appears in the above-identified patent and that said Letters Patent is hereby corrected as shown below:

On the Title Page

(63) information "CHINA PCT/CN2015/076866 filed on Apr. 17, 2015" is missing. (63) should now read:
"continuation of application PCT/CN2016/079466 filed on Apr. 15, 2016, PCT/CN2016/079466 claims benefit from the international application PCT/CN2015/076866 filed on Apr. 17, 2015"

Signed and Sealed this  
First Day of October, 2019

Andrei Iancu  
*Director of the United States Patent and Trademark Office*